United States Patent [19]

Groschwitz

[11] 3,716,804
[45] Feb. 13, 1973

[54] INTEGRATED OPTICAL-ELECTRONIC SOLID STATE SYSTEM

[75] Inventor: Eberhard Groschwitz, Munich, Germany

[73] Assignee: Siemens Aktiengesellschaft, Berlin, Germany, Munich, Germany

[22] Filed: March 31, 1970

[21] Appl. No.: 24,170

[30] Foreign Application Priority Data

April 3, 1969 Germany....................P 19 17 400.6

[52] U.S. Cl..................................332/7.51, 307/312
[51] Int. Cl. ...........................H01s 3/18, H01s 3/10
[58] Field of Search..........25/199; 332/7.51; 307/312

[56] References Cited

UNITED STATES PATENTS

| | | | |
|---|---|---|---|
| 3,546,495 | 12/1970 | Cornelly | 307/312 |
| 3,506,925 | 4/1970 | Groschwitz | 307/312 |
| 3,407,301 | 10/1968 | Kovanic | 250/199 |
| 3,435,226 | 3/1969 | Rack | 250/199 |

*Primary Examiner*—Benjamin A. Borchelt
*Assistant Examiner*—N. Moskowitz
*Attorney*—Curt M. Avery, Arthur E. Wilfond, Herbert L. Lerner and Daniel J. Tick

[57] ABSTRACT

A crystal substrate integrates a plurality of optically and electronically operating components. The substrate has a surface having a matrix having at least two circuit layers one above the other and each substantially parallel to the surface of the substrate. The components are positioned in the two circuit layers. Optical paths optically intercouple corresponding ones of the optical components and extend in at least one of the layers predominantly in directions parallel to the surface of the substrate. An optical guide plate propagates light within and parallel to the guide plate in any desired directions. The guide plate comprises different optically functional areas. At least two solid state light sources are optically coupled to the guide plate in a manner whereby when the light sources are operative an information content is provided comprising information components constituted by a network of optically correlated component light beams. The information content has an information structure comprising a plurality of adjustable information components.

20 Claims, 4 Drawing Figures

INTEGRATED OPTICAL-ELECTRONIC SOLID STATE SYSTEM

DESCRIPTION OF THE INVENTION

The invention relates to a solid state system. More particularly, the invention relates to an integrated optical-electronic solid state system.

The solid state system of the invention is for miniaturizing optical-electronic compound systems, primarily comprising combined, cooperating, optical-electronic, electrical, optical and/or photoelectric components. The compound system or configuration comprises a substrate or base crystal which integrates all optical and electronic operations and which has a surface provided with a matrix defining a spatial integration pattern which contains the complete pattern of the desired optical-electronic operations with regard to all their functions. The matrix has at least two layers which are exchangeable with regard to their electronic and optical integrating functions of which at least one is produced as a result of technical preparation of the substrate surface, while at least one other is positioned, additionally, upon the substrate. At least one layer of the matrix integrates the electronic component function of the compound system, which impresses electrical current paths, and includes electronic component regions or zones. At least another layer of the matrix comprises embedded optical component systems to which it is so subordinated in its pattern that an alternating effect develops between the electronic and the optical function components of the compound system. The optical paths intended for optical coupling of component systems which extend primarily parallel to the surface of the substrate, in at least one layer of the matrix, and the optical paths of optical and electronic coupling of optical component systems with electronic component systems in accordance with the integration pattern of the matrix, extend at various points of the substrate surface perpendicular to the direction of said substrate surface.

More specifically, the invention relates to at least two superimposed switching planes which are coupled by optical and/or electronic horizontal and/or vertical couplings, in a manner whereby horizontal and/or vertical optical and/or electronic communication operations may be performed in each switching plane, separately, or between such switching planes. The invention also relates to a matrix which functions partly as a carrier for electrical current paths as well as for optical and/or electronic components of the system provided with vertical and/or horizontal recesses, through which information-carrying light quanta may pass at predetermined points and in predetermined directions, whereby at least one optical guide plate is provided to permit the passage of light within and parallel to the guide plate, in any desired direction.

An optical guide plate permits the transfer of information-carrying light within said guide plate, in specific directions determined by the construction of said plate and the method of operation of the integrated solid state system. For this reason, the light current transferred within the optical guide plate, or specific components thereof, may pass through boundary surfaces of the guide plate only at predetermined input and output points. The optical guide plate may comprise glass, or a glasslike substance. In some cases, the optical guide plate may comprise crystalline material. In special cases, the optical guide plate may comprise semiconductor material.

In accordance with the desired possibilities, an optical guide plate may be a component of the substrate of the integrated system or it may be installed by diffusion of foreign atoms or by alloying into the substrate. The optical guide plate may also be applied in the form of a foreign layer on the substrate. In some embodiments, an optical guide plate may be provided with additional qualities or characteristics. In certain spatial areas, for example, the optical guide plate may be painted or colored in accordance with the functional construction of the entire system, or it may be coated with substances of desired optical and electrical characteristics, alloyed on or attached from the outside. The surfaces or areas of the boundary of the optical guide plate may be coated with thin layers which primarily modify the optical characteristics in such areas, in a specific manner. Thus, for example, the refraction properties of the boundary surfaces may be varied in this manner. Optical paths and their inputs and outputs in the optical guide plate may be determined within the scope of the entire plan of operation of the integrating system by coloring and providing an adjacent layer of specific geometric design. The optical guide plate may have spatially variable and/or time variable, and particularly controllable, optical and/or electronic characteristics, at least in specific areas, zones or regions thereof. The optical guide plate may comprise, in complicated embodiments, adjacent parts having shapes or configurations and physical qualities or characteristics which may differ completely and which may assume special optical-electronic functions within the complete arrangement or device. Such parts of the optical guide plate may be joined together in a horizontal continuation, or may be assembled or superimposed. They may also be arranged adjacent each other in appropriately formed recesses.

In specific or component parts, the optical guide plate may be double refractory and/or polarizing, and may comprise luminescent or optically stimulated laser-active material, such as laser-active glass or solid crystalline bodies which may be stimulated.

The principal object of the invention is to provide a new and improved integrated optical-electronic solid state system.

An object of the invention is to expand the communication-technique usage of an integrated optical-electronic solid state system for mixing and distributing frequencies.

An object of the invention is to use an integrated optical-electronic solid state system independently of, and conjointly with, optical coupling.

An object of the invention is to provide an integrated optical-electronic solid state system simultaneously with an optical switching component for a complex information content within a range of extremely short switching periods.

An object of the invention is to provide an integrated optical-electronic solid state system which functions with efficiency, effectiveness and reliability.

In accordance with the invention, an optical-electronic solid state system includes a guide plate assembled from various optically operable areas and provided with at least two optically coupled solid state lasers. The lasers are preferably laser diodes. The optical guide plate is also provided with optical inputs and outputs, so that said guide plate contains information data comprising partial information in a network of optically coherent component beams. The information content of the optical guide plate exhibits an information structure comprising a plurality of information components and controls, by intensity ratios or conditions, the phase conditions, frequencies, polarization conditions, coherency relationships and optical path length differences of the branched off and united optical component beams. The information structure also comprises correlating and non-correlating phase components or portions and has various cooperative switching positions due to internal optical coupling. The information structure is a structure of informations arranged one above the other, with regard to additional information data supplied to the arrangement of optically coherent component beams. The information structure includes extremely rapid switching transitions between individual switching positions of the complex information structure. The optical outputs provided at the optical guide plate are therefore utilized to emit the information structure in various switching positions.

In a preferred method of operation of the integrated optical-electronic solid state system of the invention, a beam network having at least partial interference is produced in the optical guide plate by irradiating preferably coherent light from laser and/or luminescent elements which are at least partly optically coupled with various inputs of the guide plate. The optical beam network is provided with an information structure comprising a plurality of information components which may be switched extremely rapidly by internal optical coupling conditions. The information structure is produced from intensity ratios or conditions, path positions, frequencies, polarization conditions and coherence ratios of the branched off and assembled component beams. The result is a complex information structure which defines specific information codes through the various switching positions thereof. The information is arranged one above the other and is emitted in the optical outputs of the optical guide plate in various codes which respond to other corresponding information structures.

In accordance with the present invention, an integrated optical-electronic solid state system having combined coacting optical-electronic, electrical and photoelectric components comprises a crystal substrate for integrating all the optically and electronically operating components. The substrate has a surface having a matrix containing a substantially complete spatial integration arrangement of the desired optical-electronic operations as to their totality of functioning. The matrix has at least two circuit layers, one above the other, and each substantially parallel to the surface of the substrate. The components are positioned in the two circuit layers. Optical paths optically intercouple corresponding ones of the optical components. The optical paths extend in at least one of the layers predominantly in directions parallel to the surface of the substrate.

Additional optical paths optically electronically couple the optical components and the electronic components in accordance with the integration arrangement of the matrix. The additional optical paths extend at correspondingly different localities of the surface of the substrate in directions substantially perpendicular to the surface whereby communication technical operations are performable in each of the layers and between the layers. The matrix at least partly provides a carrier of the components and of electrical current paths between at least some of the components. The matrix has openings at specific localities through which data carrying light beams may pass in specific directions. An optical guide plate propagates light within and parallel to the guide plate in any desired directions. The guide plate comprising different optically functional areas. The guide plate has optical inputs and outputs. At least two solid state light sources are optically coupled to the guide plate in a manner whereby when the light sources are operative an information content is provided comprising information components constituted by a network of optically correlated component light beams. The information content has an information structure comprising a plurality of information components adjustable via the intensity ratios, the phase relations, the polarization conditions, the coherence relations and the optical path length differences of branched and recombined component optical beams. The information structure comprises correlated and non-correlated phase shares and has correspondingly different cooperative switching conditions dependent upon interval optical couplings whereby the supply to the network of additional information in the form of component optical beams produces a reactionable layered information character with extremely rapid switching between the different conditions of the information structure, the optical outputs of the guide plate functioning to radiate as outputs the complex information of the different switching conditions.

Each of the light sources comprises a laser diode. The optical guide plate comprises a plurality of component zones of a material transparent to optical frequencies utilized. The zones have polished boundary surfaces in direct abutment with each other. One of the component zones of the optical guide plate is a prism. The light sources comprise at least two spaced parallel laser elements optically coupled with the optical guide plate and optically coupled with each other and themselves via the optical guide plate. One of the component zones of the optical guide plate is an optically non-linear double refraction component.

An optical branch point is in the optical path being utilized. One of the component zones of the optical guide plate is a polarizer for the light beam. One of the component zones of the optical guide plate is an analyzer for the light beam. The optical guide plate includes and combines optical-electronic functional components by optical paths of variable lengths. The optical paths terminate in the optical outputs. The optically non-linear double refraction component of the optical guide plate comprises a KDP crystal. The polarizer of the optical guide plate controls the polarization capacity of the optical path. The polarizer of the optical guide path controls the optical path length of the optical path.

In accordance with the present invention, a method of operating an integrated optical-electronic solid state system including sources of radiation, comprises the steps of radiating coherent light from the sources to provide an at least partly interfering network of light beams, controlling the intensity ratios, phase relations, frequencies, polarization conditions and coherence relations of branched off and combined light beams to produce an information structure comprising a plurality of information components which may be switched extremely rapidly due to internal coupling conditions, variably switching the information structure to provide a complex information content having a layered arrangement of information configuration representing specific information codes, and emitting the entire information in various codes which may react with other corresponding information configurations.

The produced combined information content is emitted with variable information structures which may react with other systems. The coherent light is radiated in optical alternation to produce a coherent optical coupling between the sources of radiation to shape the information into an information mixture having a reactionable information configuration.

In order that the invention may be readily carried into effect, it will now be described with reference to the accompanying drawings, wherein.

In the FIGS., the same components are identified by the same reference numerals.

Figure 1:
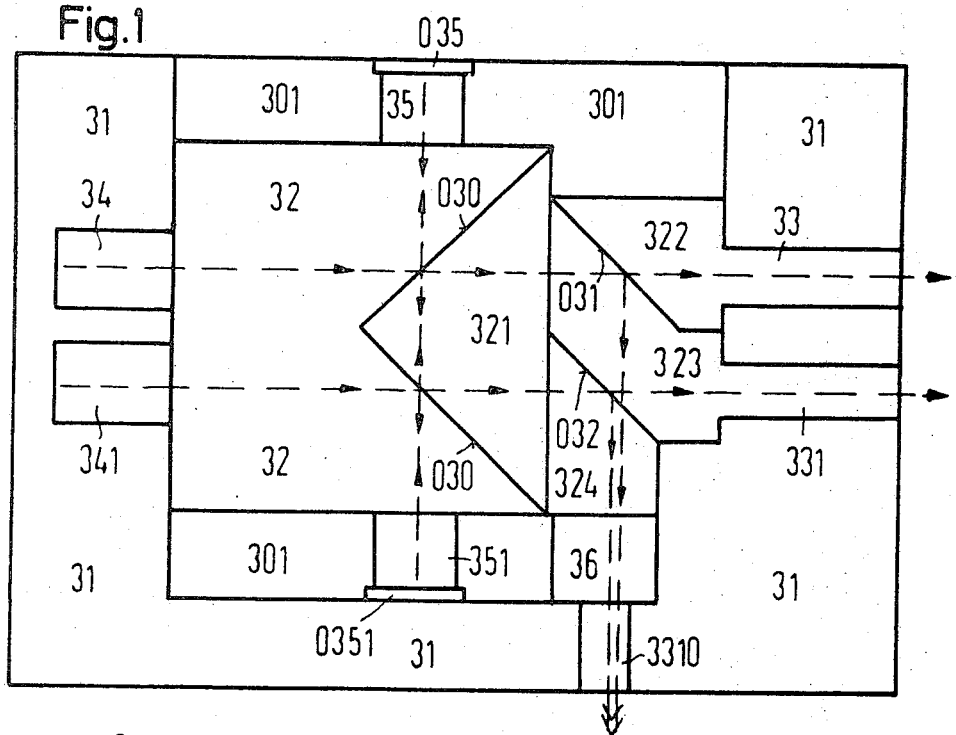
FIG. 1 is a schematic diagram of an embodiment of the integrated optical-electronic solid state system of the invention.

In FIG. 1, the integrated optical-electronic solid state system includes an optical guide plate for frequency mixing and distribution in an optical frequency range of preferably coherent beams. The integrated optical-electronic solid state system comprises a basis semiconductor crystal or substrate of low conductivity. In FIG. 1, a semiconductor crystal 301 has surfaces 31. The crystal surfaces 31 are positioned higher than those of the crystal area, region or zone 301. An optical guide plate is positioned on the lower crystal region 301 and preferably comprises parts or components 32, 321, 322, 323, 324 and 36, which parts are assembled without interruptions or separations and with polished lateral surfaces.

The parts 32, 321, 322, 323, 324 and 36 of the optical guide plate preferably comprise glass or glasstype materials which are transparent to the optical frequencies utilized. The component 36 is preferably a double refraction, optically non-linear, crystal plate. Optical conductance paths 33, 331 and 3310 are provided as optical outputs of the system.

Two independent light sources 34 and 341 are provided in the integrated system and preferably produce coherent beams. The light sources 34 and 341 may comprise, for example, two laser components of glass, which may be stimulated, or two laser crystals. The required inversion energy is derived from another light source, not shown in the FIGS. The other light source is either an element of the integrated system, such as a laser or luminescence diode, or is outside the integrated system.

The light sources 34 and 341 may be two luminescence, or preferably laser, diodes which are alloyed into the semiconductor substrate. The light sources 34 and 341 may also be another semiconductor material embedded into depressions provided in the crystal surface 31. In either arrangement, the electrical leads for the light sources 34 and 341 as well as other electronic components of the integrated system, are designed in a conventional manner as curved paths and are either diffused into the substrate or alloyed into the substrate and may extend partly below the optical guide plate.

The integrated ohmic current paths are not shown in the FIGS., since the components 34, 341, 35, 351 and 36 may have different functions in the different embodiments. This would necessarily vary the integrated current paths of the electronic pattern.

The method of operation of the optical guide plate for mixing and distributing frequencies within a range of optical frequencies is as follows: Each of the two light sources 34 and 341 emits, in directions parallel to each other, at least one optical frequency. The optical frequencies emitted by the two light sources 34 and 341 deviate from each other. These optical frequencies are first transferred into the part or portion 32 of the optical guide plate. Actually, of course, this always relates to frequency ranges which must be defined by their characteristic frequency of maximum energy. The frequency ranges may even overlap, in borderline cases. Such instances are of interest only when corresponding frequencies of the two frequency ranges coincide, but are not of interest with regard to the other optical properties such as, for example, intensity, polarization and coherence.

The two representative frequencies are transferred through the part 32 of the optical guide plate to the part 321 thereof. The part 321 of the optical guide plate has the shape or configuration of a prism. The lateral surfaces 030 of the prismatic part 321 are reflective and transparent simultaneously. The geometric position and physical characteristics of the lateral surfaces 030 cause a portion of the intensity of the two beams in the part 32 to be projected in vertical directions so that they impinge upon mirror components 035 and 0351 respectively. At the mirrors 035 and 0351, the component beams which branch off rectangularly from the initial path of radiation are reflected back into themselves after traversing the optical operational components 35 and 351, respectively. Obviously, the beams directed toward each of the optical components 35 and 351 include part of the beams from the other of said optical components.

In the embodiment of FIG. 1, small polarizers 35 and 351 are included in the integrated solid state system. The parallel beams or rays of radiation which develop at the lateral surfaces 030, after passing through the part 321 of the optical guide plate, include a mixture of optically variable rays emitted by the light sources 34 and 341. The light sources 34 and 341 are independent and preferably emit coherent light. The light sources 34 and 341 function as two independent inputs of the integrated solid state system, in communication technology.

The mixture of information from the light sources 34 and 341, or provided via said light sources, varies in both parallel beams in the part 321 of the optical guide plate. Such mixture of information may be adjusted, as desired, in accordance with the invention, via the mirrors 035 and 0351, with regard to the characteristic magnitude of frequencies, intensities, polarization, coherence and interference properties of the components of the beams, with regard to the qualities and method of operation of the light sources 34 and 341 and the polarizers 35 and 351.

The ray or beam in the part 32 of the optical guide plate, emitted by the light source 341, is characterized by its representative frequency within its subordinated spectrum, and by its intensity. By modulating the intensity, or with the assistance of a pulse sequence, the beam emitted by the light source 341 may absorb a specific content of information. When the beam passes the lateral surfaces 030, only a specific intensity portion continues or propagates from such beam in the zone 321 of the optical guide plate.

The remaining intensity of the beam is deflected rectangularly by partial reflection, is reflected back into itself at the mirror 0351 and is transferred via the polarizer 351 in a preferred direction of polarization. As a result, such component portion of the beam has an additional optical characteristic and thus functions as an information carrier. The information is essentially coded by the preferential direction of a specific polarization, relative to a subsequently completed analysis of the information content supplied by the integrated system, as compared to all other possible polarization positions of the beam.

In the path of the beam which is branched off by partial reflection, the information content is therefore no longer expressed by the magnitude, frequency and intensity. The branched off beam path provides a special impression by a specific polarization position of the information-carrying, branched off beam. The impressed information content may be supplied to an appropriate detector only with simultaneous detection of frequency, intensity and polarization. Such a detector may comprise, for example, an analyzer and a component of a known type of integrated optical-electronic solid state system.

The beam emitted by the polarizer 351 then enters the area 321 of the optical guide plate and is superimposed with the partial propagated beam in said area emitted from the light source 34, after interior reflection at the surface 030. After the superimposition, the beam emitted from the light source 34 contains its own information content at its own representative frequency and intensity, including modulation. The beam emitted by the light source 34 is then expanded in the area or zone 321 of the optical guide plate by the information content emitted from the light source 341 and encoded in the polarizer 351.

The beam emitted from the polarizer 351 not only enters the zone 321 of the optical guide plate, but is also guided partly in the zone 32 of said guide plate into the information or light source 341 and into the polarizer 35. In special cases, this may produce selective self-stimulation in the light source 341, and, by coinciding with the polarization, may produce a corresponding reflection in the polarizer 35. These two possibilities in the light source 341 and in the polarizer 35 are included in my invention, with regard to a more precise operation of the communication technique resulting therefrom, but are not specifically disclosed herein in order to maintain simplification of the basic principles of the invention. Overlooking of these effects on the combined information contents emitted at the three outputs of the integrated system corresponds to the readily realizable circumstances that there is no selective self-stimulation excited in the source 341 by optical feedback of the beam content reflected back from the polarizer 351, and that, further more, the polarizer 35 is not to be adjusted to the polarization condition of the light emitted from the source 341.

Under the foregoing circumstances, the information emitted by the light sources 34 and 341 is distributed to the beam paths parallel to each other in the zone 321. The condition is analogous to that in which the beam emitted from the light source 34 is transferred in the same direction, in the area 321, as from the light source 341. The information content emitted from the light source 341 or impressed upon the light beam provided by the light source 341 is indicated by the representative frequency of said light source and by the subordinated intensity, including modulation. This information content is expanded in the area 321 by the information content emitted from the light source 34 and encoded in the polarizer 35. Finally, after passing through the other parts, areas, zones or regions 322, 323 and 324 of the optical guide plate, the parallel beams in the area 321 enter the optical guide paths 33 and 331. The parallel beams enter the optical guide paths 33 and 331 via the optically transparent and simultaneously reflecting boundary surfaces 031 and 032. The optical guide paths 33 and 331 are outputs of the integrated optical-electronic solid state system of the invention.

The output 33 therefore emits the information content from the source 34, at its frequency and intensity, mixed with the information content of the source 341, and another frequency and another intensity, and encoded by polarization in the polarizer 351. Analogously, the information content from the source 341 is emitted at the output 331. The information content emitted at the output 331 is expanded by the information emitted from the source 34, encoded in the polarizer 35. Furthermore, the information content at the output 33 is added at a specific ratio of intensity at the output 331, via partial reflection at the surface 032. The content at the output 33 is thus differently encoded, however, due to its different polarization condition. The mixing ratio of the combined information may be varied by variation of the intensity ratio between the light source 34 and the light source 341.

The integrated system of the invention has a third output, in addition to the output 33 and the output 331, comprising an optical guide path 3310. The entire information mixture produced in the optical guide plate 32, 321, 322, 323, 324 is emitted in a single light beam from the integrated system via the output 3310. The single light beam emitted via the output 3310 combines the various optical paths of the system. Before the light beam enters the optical guide path 3310, it passes through the operational component 36 of the integrated system. The operational component 36 is preferably an optically non-linear crystal plate utilizing non-linear effects such as, for example, the occurrence of harmonics or the development of difference frequencies and frequencies of the information mixture for communication technique. The optically non-linear effects are known in the art in the use of KDP crystals. In the integrated system of the invention, however, the non-linear effects are combined, beyond the state of the art, with the possibilities of mixing information in accordance with the invention.

The mixing of the information, in accordance with the invention, occurs within the optical guide plate, as hereinbefore described. This results in the performance, by the integrated system of the invention, of new optical-electronic information operations, and provides a series of various possibilities which may be realized within the scope of the invention from specific correlations or subordinations relative to the operational components 34, 341, 35 and 351. Although all the possibilities are not described herein, a brief account of some of the possibilities is hereinafter provided.

Figure 2:
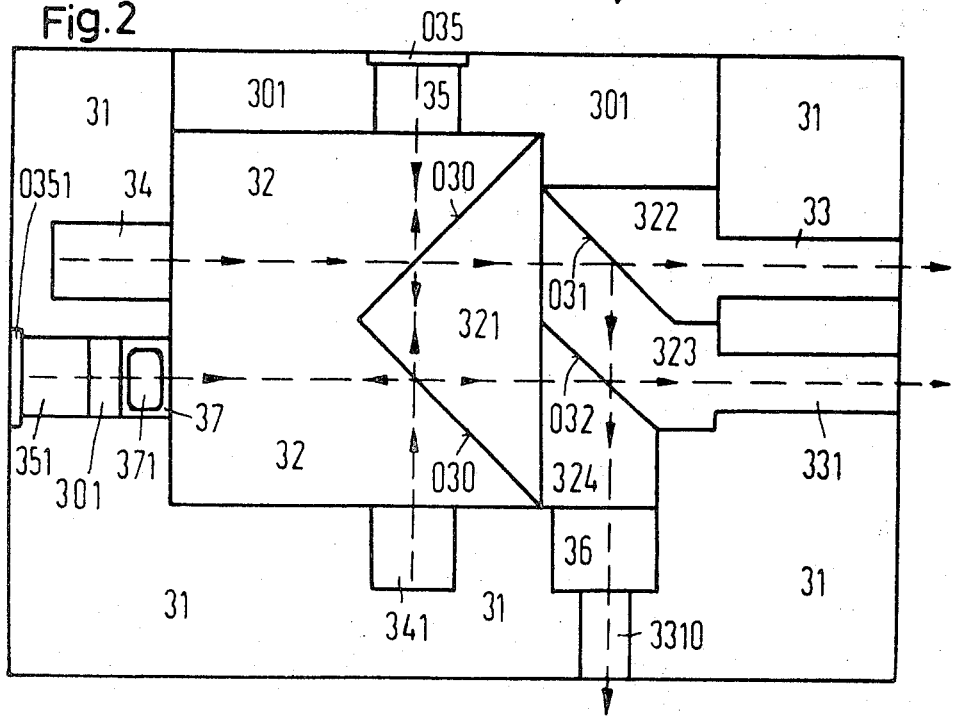
FIG. 2 is a schematic diagram of another embodiment of the integrated optical-electronic solid state system of the invention.

If, for example, an optically non-linear KDP crystal is utilized as the operational component 36 of the integrated system, and if the light source 341 is a laser element and is exchanged in position with the polarizer 351, as shown in FIG. 2, then the interference components of the arrangement and the components of the laser beam, emitted from the source 341, which are variably polarized in the polarizers 35 and 351, may penetrate the KDP crystal 36 as an ordinary and an extraordinary beam. At a specific phase adjustment, depending upon the traveled optical path length of the integrated component rays or beams, a coupling of said component rays occurs in the KDP crystal 36. The coupling of the component rays results in a second harmonic of the representative frequency, issuing from the light source 341. The phase adjustment of the two component beams may be electrically controlled in a conventional manner by an optical phase shifter and may be periodically varied in special cases.

A piezoelectrically controlled crystal 37, having an upper control electrode 371, shown in FIG. 2, and a lower control electrode, not shown in the FIG., is positioned, for example, as an additional operational component of the integrated system, into the component beam input of the polarizer 351. In accordance with the structure and axial direction of the crystal 37, at least one electrode may be mounted on the lateral surface of said crystal, perpendicularly to the plane of the illustration and perpendicularly to the direction of the beam. The electrode may thus, for example, be mounted between the crystal 37 and the optical guide plate area 32. A diaphragm opening is left open for the beam passing through the crystal 37.

The electrical leads for the phase shifter may be positioned as ohmic current paths in the substrate, by diffusion or alloying. This also applies to at least one control electrode of the optical phase shifter. In special embodiments, the same result may be obtained by reflection of the component beam of the polarizer 351 at a crystal surface having an electrically controllable reflection characteristic. The optical phase shifter may also be part of the optical guide plate, so that the control function of the phase shifter is absorbed into the optical-electronic operations of the optical guide plate.

The polarizer 351, the mirror 0351 and the optical phase shifter 37, 371 may be positioned outside the integrated system. In such case, the two operational components may be part of another integrated system from which the phase adjustment of the interference beams or rays emitted from the source 341 may be controlled.

Figure 3:
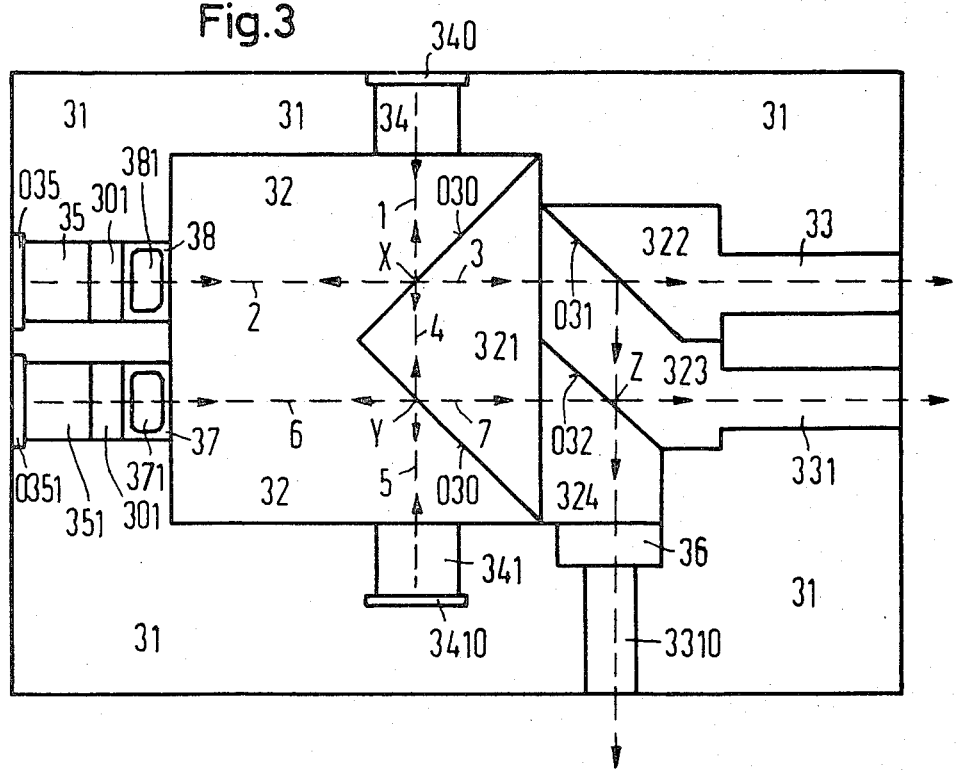
FIG. 3 is a schematic diagram of still another embodiment of the integrated optical-electronic solid state system of the invention.
Figure 4:
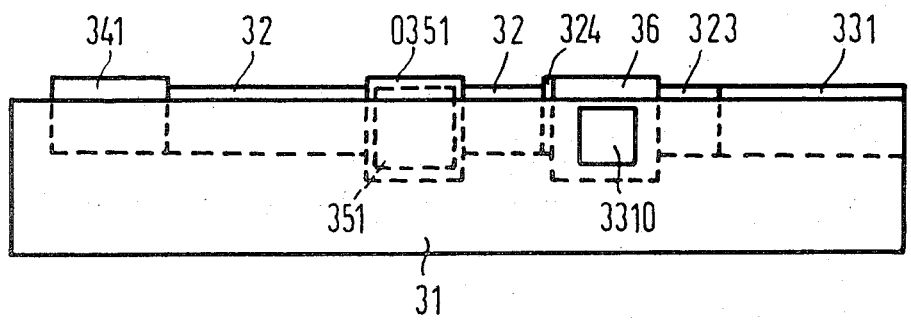
FIG. 4 is a cross-section of the integrated optical-electronic solid state system of the invention.

The higher or raised surfaces 31 and the lower or depressed surfaces 301 of the base crystal or substrate are shown in FIGS. 2 and 3, as in FIG. 1, and are distributed variably over said substrate due to different arrangement of the integrated systems. The differences in the processing of information contents are of primary importance, however. Contrary to FIG. 1, in the embodiment of FIG. 2, the information of the laser beam emitted from the source 341 is distributed to two differently polarized and interfering component beams. In the embodiment of FIG. 1, the polarization of the component beams denotes an encoding of its information content.

In the embodiment of FIG. 2, another stage, for encoding the information, is added for the laser beam emitted from the source 341, as an interference structure of the polarized component rays provided by the piezoelectric crystal 37 by phase adjustment. In the KDP crystal 36, the information distributed over the polarized component beams emitted from the source 341 is then transformed to a second harmonic. The intensity of the beams depends considerably upon the phase adjustment of the component rays of the laser source 341, produced in the piezoelectric crystal 37. Thus, obviously, the interference structure of the component beams is transposed as a degree of the intensity of the information in the harmonic, in the operational component 36. If the phase adjustment is electrically modulated in the piezoelectric crystal 37, such modulation is transferred as additional information relative to the intensity of the harmonic of the frequency emitted from the source 341. The harmonic is produced in the operational component 36.

The intensity of the modulation produced in the source 341 remains in the operational component 36 in the range of the non-transposed interfering information component. The non-transposed interfering information component is, however, also emitted in the output 3310 by the integrated system, with the information under the control of the piezoelectric crystal 37 which is transposed in the operational component 36 into the harmonic of the frequency provided by the source 341. In each of the non-transposed components, the information from the source 341, or supplied from said source into the integrated system, is encoded in two different polarization conditions of the interfering component beams. The total information emitted at the output 3310 also contains mixtures of the information provided by the laser element 34, or introduced at the source 34. This additional or mixed information is encoded in a component part via the polarization condition provided at the polarizer 35 and in the other component portion in the basic condition of the laser element 34.

If the integrated system does not include the partially reflecting boundary layer 031, the outputs 331 and 3310 no longer contain the information from the source 34 in its basic condition. When there is no boundary layer 031, the total information emitted from the outputs 331 and 3310 includes information from the source 34, only in encoded condition, in a condition of polarization, due to the polarizer 35, of the subordinated component beam of the basic beam emitted by said source. Contrary to the output 3310, the total information of the output 331 does not include information components transposed to a new frequency via the operational component 36.

If the frequency of the source 341 itself contains information such as, for example, in the form of a pulse sequence, such information will be transposed again in the harmonic resulting therefrom in the operational component 36. The intensity fluctuations of the pulse sequence transposed in the operational component 36 include information of the phase control, provided in the piezoelectric crystal 37, of the information from the source 341. In the operations of the integrated system of the embodiment of FIG. 2, it is assumed that both coherent beams from the sources 34 and 341, contrary to the coherent beams of the source 341, do not mutually correlate. The information from the source 34 is not then transposed in the operational component 36.

If, however, no optical alternating effect exists between the sources 34 and 341, due to coupling or due to a partially mutual or even unilateral stimulation, then, as an effect of a higher order, a transposition of the information from the source 34 may also occur in the operational component 36. This is due to the information component from the source 34 being, at least partly, coherent with the information components from the source 341. If the frequencies from the sources 34 and 341 are varied, new difference frequencies may occur in the optically non-linear operational component 36 and may be transposed in the component of the resultant combined information content.

In the embodiment of FIG. 3, other possibilities may be provided for a coherent information complex from the information component via optical-electronic operations and distributional operations in the integrated system. Compared to the embodiment of FIG. 2, the embodiment of FIG. 3 is symmetrical with regard to the light source 34, the polarizer 35, the light source 341 and the polarizer 351. An information-carrying laser beam from the laser element 341 is divided into two component beams at the reflecting and transparent boundary layer 030 between the areas 32 and 321 of the optical guide plate. One of the component beams is transferred to the polarizer 351 and the other is transferred to the laser element 34.

The component beam is directed back to itself, toward the polarizer 351, via the reflection at the mirror 0351. The polarizer 351 is then in a specific condition of polarization. Part of the reflected and polarized component passes through the zone 321 and carries the information from the source 341, encoded due to the polarization condition of the polarizer 351, to the output 331 and to the optically non-linear crystal 36 and the output 3310. The other portion of the component reflected at the mirror 0351 and polarized by the polarizer 351 is reflected back into the laser element at the boundary layer 030. This results in an optical feedback relative to the preferred condition of polarization.

The optical feedback has a selective stimulating effect on the emission of the source 341, and, ultimately, a resulting beam is emitted from said source which is coherently connected with the component beam polarized by the polarizer 351. The information content of the beam selectively stimulated, modified by the optical feedback, is coherently guided, on two optical paths of the source 341 and the polarizer 351, into the area 321 of the optical guide plate. The information content of the laser 341, transposed in the extension of the component beam or rays reflected at the mirror 0351, is transferred directly to the output 331 and to the optical non-linear crystal 36.

The information content transferred to the area 321 in the direction of emission from the source 341 is combined by inside reflection at the boundary layer 030 of the area 321 with the information from the source 34, encoded by the polarizer 35, by polarization. The information content is emitted with a component ray or beam via the output 33 of the integrated system. Simultaneously, another component beam, reflected at the boundary layer 031, is provided with the information mixture from the source 341 and 34 occurring in the area 321 of the optical guide plate. Such other component beam is first transferred to the optically non-linear crystal 36 and then to the output 3310.

The foregoing concerns the structure of a coherent radiation field of the laser 341, comprising a plurality of component beams, the information content of which is encoded and distributed to coherent components of various propagation directions. This applies, in an analogous manner, to the radiation field of the laser 34 and the correlating polarizer 35. The variable and independent information contents of the two coherent radiation fields of the source 341, comprising a plurality of partially coincident component beams on one hand and the source 34 and the polarizer 35 on the other hand, are combined in the region 321 of the optical guide plate into a mixed information content, and are distributed to two variable optical paths in parallel and to the right from said region, and provided with adjustable intensity ratios.

An important feature of the invention is that the information content comprising component information, and combined in the optical field plate of the integrated optical-electronic solid state system, is an adjustable information structure having various physical magnitudes and/or relations. The information structure is further characterized, in addition to the intensity ratios of the component information, by its frequencies and the variable polarization conditions of such frequencies, and by the optical path length differences of the component beams or rays. The information structure is additionally characterized by the subordination to one another via coherence correlations of the specific component beams having information components, whereas no such correlations exist between other component beams. That is, the information structure of a combined information content may comprise components with correlating and non-correlating phase relations.

With regard to communication technology, each information structure indicates a type of code for further optical-electronic processing of the combined information content. The processing of the information structure may be accomplished in different ways, such as, for example, outside the integrated system within which the information structure is produced, or in subordinated integrated optical-electronic systems in accordance with my invention. A specific composition or decomposition of the information content may be effected at least partly in the same integrated system.

The embodiments of FIGS. 1, 2 and 3 illustrate a characteristic feature of the invention. The combined information content produced in the optical guide plate of the integrated system is emitted with a variable information structure in the outputs 33 and 331 and the output 3310. For further processing of the combined information outside the integrated system, this means that each information structure permits another composition, decomposition or transposition of the combined information content. Composition is related to an expansion of the information content. Decomposition is a division of the information content with a reduction into component information having specific information structures. Transposition is a transfer of combined information content into a new or partially new information structure which may absorb additional information components of another combined information content.

An example of a specific optical-electronic processing of information contents combined in the optical guide plate with adjustable information structure may be provided by the embodiment of FIG. 3, in combination with the optically non-linear crystal plate 36 which is included in said embodiment. The optically non-linear crystal plate 36 is connected ahead of the output 3310. In the example, the optically non-linear crystal plate 36 is preferably a KDP crystal plate which is included in the integrated system as an operational component thereof.

In the aforedescribed embodiment, an information structure of an information mixture may be compared with specific characteristic features of encoded information. The conception of the information structure, configuration or shape is pertinent. Such conception justifies the fact that the aforedescribed physical structural quantities of an information structure effectively or potentially assume the importance of an information portion within the total information of the system. The combination or the functional correlation of the information portions is an information configuration, structure or shape in the interpretation of a physically defined information structure. The conception of the information configuration is a fundamental feature of the integrated laser technique of the invention. The production of information configurations in an information mixture of an integrated laser system presents novel operational possibilities or communication techniques, utilizing information mixtures. This depends upon the following basic qualities of an information structure, configuration, complex, shape, constellation, construction, or the like, of an information mixture in an integrated laser system. An information structure may function, within itself and outside itself, as an information entity. An information structure permits information synthesis and a layered construction of communicable importance. Furthermore, an information structure has reaction capability relative to other information structures or to information in an information mixture. This is a singular or typical information complex.

The aforedescribed characteristics of an information structure may be realized, in accordance with my invention, in integrated laser systems which comprise an optically coherent network of branched off, and at least partially coherent component beams, which combine a system of cooperating optical function components with inputs and outputs for the production of an information mixture. The cooperating optical function components are, for example, laser crystals or optically stimulated glasses, prisms, totally reflecting and semitransparent mirrors, polarizers, analyzers, optical phase shifters, interferometers, optical filters, control components for optical path lengths, double refractory crystals, etc.

Optical information supplied to such integrated systems, or at least partially produced therein, is an information mixture emitted in various optical outputs of the system, with variable information structures. Characteristic physical quantities of an information structure are, for example, the frequencies, the modulation, the intensity ratio of the various frequencies in a commonly traversed optical path of a component beam of the optically connected network, the optical polarization conditions, the coherence relations in branched off and recombined component beams, the optical path differences and the phase conditions, the degree of excitation or stimulation in conversion conditions of laser elements, the optical stimulation, the optical coupling between laser elements, the optical control or switching of the laser elements, and the like.

The number and type of the aforedescribed characteristic physical quantities may vary in different information structures. It is essential, however, that, in accordance with the invention, the characteristic physical quantities determined an information structure which, when cooperating within their value ranges, possesses notable importance as an information structure of an information mixture which is capable of functioning and reacting. Thus, within the optically connected network of the integrated laser system, an information mixture is included in the individual component beams of the network, with variable coordination conditions of a functionable information coherence. The coordination conditions are emitted as communicable information structures in the optical outputs of the integrated system.

The aforedescribed importance of the invention, relative to communication technique, for producing and distributing information mixtures in integrated laser systems, is of primary interest in data processing instruments utilized in cybernetics.

The conceptions of the operational possibilities having information mixing such as, for example, information structure, information configuration, information shape, and so on, are hereinafter disclosed and demonstrated with reference to a simple characteristic example. The mode of operation of the embodiment of FIG. 3 is the special example. The information-carrying branched off optical paths are indicated in FIG. 3 as optical paths 1, 2, 3, 4, 5, 6 and 7, in the areas, zones or regions 32 and 321 of the optical guide plate.

The interferometrical branch off and recombination points in the optically coherent network of the component beam along the optical paths 1 to 7 are indicated by X and Y. The points X and Y are located in the two optically transparent and reflecting polished boundary surfaces 030, between the zone 32 and the zone 321 of the optical guide plate. The component rays or beams in the remaining regions 322, 323 and 324 of the optical guide plate are not indicated by reference numerals in order to maintain the clarity of illustration of FIG. 3.

The production of information mixtures and the layered construction or structure of the various information configurations which are capable of reaction with other information mixtures are hereinafter explained. The reaction of information configurations defines a complex switching operation in optically coupled integrated laser systems of the type of the invention, in communication technology.

The process of information emitted by the laser element 34 of the embodiment of FIG. 3 may be observed. This information may be included, for example, in a modulation of a physical characteristic quantity of the laser beam 1. At this point, it is explained, from the point of view of communication technique, what the general meaning of the transfer of an information content in a light beam of the optical-electronic system is and what it means generally. In addition to other possibilities, the information content may be, as is well known, the product $n \log s$, which in the period of communication transfer of symbol $n$, transferred in the laser beam 1, may be indicated by the logarithm of the symbols $s$ which may be available. The symbols utilized may be of the most varied type and may generally be regarded as components in a space. The signals containing such symbols may be transferred by pulses or continuously, via the light beams of the integrated system.

The coherent beam 1 of the laser element 34, which carries information, is emitted at the point X from the zone 32 of the optical guide plate into the adjacent zone 321. The zones 32 and 321 have the same optical characteristic. In the zone 321, the information content is guided or transferred via a beam 4, after internal reflection at the point Y, into a beam 7. The beam 7 finally reaches the optical output 331 of the integrated system from the point Y. In a partly reflecting optical branch at a point Z on the boundary surface 032, the information content is supplied via the zone 324 to the optically non-linear crystal 36 and thence to the output 3310.

The observed optical path of the information content contains a basic component of the information mixture. The included physical characteristic quantities comprise the information structure of the observed information content emitted by the source 34, relative to the information transfer along the observed path. Such information structure of the selected basic component is definitely not unimportant, from the point of view of communication technology. On the contrary, it permits two different outputs 331 and 3310 having variable physical structures. The output information is expanded by the optically non-linear element 36 of the integrated system, due to the non-linear effect, before it reaches the output 3310.

Basically, the expansion of the information structure constitutes one of the prerequisites for various information configurations in an information mixture. Another requirement is physically based upon the principle of optical branching off and coherent reunification, with an expanded or reduced information structure. This will now be demonstrated.

The information emitted from the source 34 and contained in the laser beam 1 is also reflected at the point X into the polarizer 35 and is then provided with a preferential direction of polarization and transferred or guided, via the component beams or rays 2 and 4, in the expanded information structure, to the output 33. Simultaneously, this information component is reflected at the boundary surface 031 and is reunited with the first observed component determined by the optical paths 1, 4 and 7 in the area 324 of the optical guide plate. This does not produce an information mixture in the sense of the invention.

The information which is guided or transferred to the output 3310, after reunification, contains an information content, able to react, in the coherently united component beam in the zone 324. If this information configuration is transferred to another integrated system in accordance with the invention, it may react in such other integrated system with other information configurations by releasing complex switching operations within the optical-coupled laser network, whereby new information configurations result from such operations.

In order to provide a corrected evaluation of the importance of the foregoing facts in communication technology, it is emphatically pointed out that such facts relate to laser switching operations at the physical boundary of the switching velocity of atomic systems. This new view point, developed for the first time by my invention, utilizes these physical possibilities for the construction and switching reaction of information configurations to be utilized in communications. This novel aspect provided by the invention reveals a technically feasible field which considerably expands the prior state of the art for computer and cybernetic systems.

The reaction capability of the aforedescribed information configuration is derived in a specific manner in the embodiment of FIG. 3, by the alternating effect of said information configuration with the optical non-linear element 36 of the integrated system. The alternating effect is exhibited in the production of at least one new information configuration in which new frequencies occur. The process may be controlled by a piezoelectric crystal 38, having an upper electrode 381 and a lower electrode, not shown in FIG. 3, and functioning as an optical phase shifter. If the control becomes a carrier for information symbols, a specific information mixture will occur in the new information configuration produced in the operational component 36, due to non-linear effects. This mixture combines the information contents emitted from the source 34 and provided by the optical phase shifter, in a very specific structure.

Other information mixtures having layered structures via information configurations are illustrated by the information content emitted from the laser element or source 341. First, it is immediately recognized that such information content is, analogously to the information content emitted by the source 34, a basic component of the information mixture to be produced. This is contained in the optical paths 3, 4 and 5, and is ultimately emitted via the outputs 33, 331 and 3331. The information structure in these outputs varies as hereinbefore described.

A partial reflection of the light beam 5 at the point Y of the boundary surface 030 causes the information emitted by the source 341 to branch off to the polarizer 351. The branched off information is provided with a structural expansion in the polarizer 351 due to a direction of polarization and is transferred back to the point Y via a beam 6. The information branch or beam 6 is directed from the point Y to the output 331 in a beam path 7. Coherent reunification also occurs, due to partial reflection at the boundary surface 032, with the basic component of the information content emitted from the source 341. Such basic component is transferred along the optical paths 3, 4 and 5. The reunification occurs in the area 324 of the optical guide plate.

The coherent reunification has a specific information structure, due to its physical characteristic quantities hereinbefore described. Since such a physical information structure is itself a carrier of symbols, it is able to assume information significance. The information significance is an information configuration which may be controlled by the optical phase shifter. An information configuration has a space-time functioning property and may produce complex switching reactions, resulting in new information configurations, in integrated systems of the invention, during alternating effect with other information configurations. The process is called a reaction, because it is generally similar, with regard to its transfer significance, to a molecular chemical reaction.

The two basic components of the information contents emitted from the sources 34 and 341 have been observed and the development of information configurations through coherent reuniting of information structures has been described. These information configurations are derived, independently from each other, from the information content emitted from the sources 34 or 341. In the present stage of construction of layered information mixtures, the two basic components of the information content emitted from the source 34 are independent from those emitted from the source 341. This is particularly true for the information configurations produced therein.

The information configurations from the sources 34 and 341 have no symmetry in the information structure and in the output 3310, even in the zone or region 324 and in the output 3310, even when the information contents of the sources 34 and 341 are assumed to be identical. This is due to the variable optical paths relating to the information configurations. Basically, the layered information arrangement is increased by non-symmetry in the information configurations. Symmetrical conditions reduce the degree of the information layered arrangement.

In the next stage of the layered arrangement construction of information mixtures, examples are illustrated of those which are combined of basic components of information contents emitted by the sources 34 and 341. An information mixture occurs in the optical path 7, combining a basic component emitted by the source 34 with a basic component of the information content of the source 341. The basic component derived from the source 34 is in the optical paths 1, 4 and 7, and the basic component mixed therewith in the optical path 7, is supplied from the optical path 5, via the optical path 6, in the component beam 7. This mixture is not coherent in such stage of the layered arrangement. It is emitted in the outputs 331 and 3310 with various information structures.

The various information structures emitted at the outputs 331 and 3310 are of a non-coherent information mixture and are communication content specific information configurations which are illustrated in the example by an absence of coherence between the mixed basic components of information contents derived from the sources 34 and 341. In an analogous manner, a non-coherent information mixture develops in the component beam 3. This information mixture comprises a basic component of the information content, included in the optical paths 3, 4 and 5, emitted by the source 341, and a basic component which is supplied from the source 34, at the optical path 3, via the optical paths 1 and 6. Contrary to the foregoing, this information mixture is emitted in three, rather than two, outputs, 33, 331 and 3310, with correspondingly different information contents.

The last stages of a layered arrangement of information mixtures having information configurations which may react are determined by the feasibility of an optical coupling between the laser elements within the integrated optical-electronic system. The last stages of the layered arrangement of information mixtures thus differ due to the circumstance that such optical coupling between the laser elements may be incoherent. Beyond this, a particularly important group of simultaneous switching operations may be realized by coherent optical coupling. More particularly, a direct switching coupling of at least one laser element may be effected by at least another laser element of the integrated system or a laser element of a corresponding integrated system of the type of my invention.

The examples presented do not represent all the information mixtures of this type, but only a few basic information mixtures of the last two stages of the layered arrangement. Additional embodiments are mentioned, but are not explicitly disclosed.

The information content emitted by the source 341 may be observed from the viewpoint of the aforedescribed general significance of the concept. The information content is supplied from the component beam 5 at the branch off point Y to the component beam 7, where the passing optical branches 6, via the polarizer 351 and the phase shifter 37, 4 and 1, via the laser element 34, unite coherently. The information configuration derived at this stage is emitted to the optical putput 331. This information configuration is also branched off in the zone 324 by a partial reflection at the boundary surface 032. The branched off information configuration is then transferred through the optically non-linear crystal 36 to the optical putput 3310.

As hereinbefore described more than once, the information configuration in the optical component 36 may be reshaped by optical non-linearity. Another configuration results from the hereinbefore mentioned information content of the laser element 341. This is due to the fact that the basic component transferred from the optical path 5 at the branch off point Y, and continued in the optical path 4, is again branched off at the point X, after twice traversing the optical path 1, including the laser source 34. The branch traversing the point Z is polarized in the polarizer 35 and is optically phase adjusted or controlled in the piezoelectric crystal 38. The basic component is then transferred or guided to the optical output 33 via the optical path 3.

Another information configuration of an essentially higher stage is provided due to the fact that the component just observed in the optical path 3 is partially reflected at the boundary surface 031 and is coherently united with the component of the optical path 5, 6, 351, 6, 7, at the branch off point Z. The resultant information configuration of the content emitted by the source 341 includes the different adjustment optical polarization conditions of the polarizers 35 and 351. These are in the form of expanded elements of the information structure and permit structural control of the information configuration and information expansion by coherence control of the optical phase shifter. This results in the information influence of the integrated system upon the laser element 34, said integrated system being optically coupled to the structure of the information content under observation.

It is important for an understanding of the invention to illustrate the characteristic and novel qualities of the aforedescribed information configuration with regard to communication technology and information theory. This type of information configuration represents a complex active switching condition which is capable of reaction and transfer within a multidimensional sign or symbol system. The switching operations within the information configuration, or in an alternating effect with other similar information configurations, fall into the range of ultrarapid lasers and laser switching velocities. The switching velocities of conventional automatic electronic information arrangements are slower by orders of magnitude, since the switching times of the reactions of an information configuration are shifted by the naturally determined limiting ranges for automatic switching periods in a stimulated emission produced by light pulses.

The novel viewpoint, added to the switching principle, is based on the communication technological utilization of the information characteristics of an information configuration. The comparison of such an information configuration in a transfer of importance with a chemically reacting molecule apparently facilitates the understanding of the prevailing facts, if it is assumed that the molecular structure of the material is, in the comparison, a multidimensional sign or symbol system, and that a reaction capacity of the information configuration with regard to information corresponds to the chemical reaction potential of the molecule.

The information configuration of the information content emitted by the source 341, which was produced at the branch off point Z by coherent reunification and which is hereinbefore described with regard to occurrence and characteristics, is emitted, unchanged, at the output 331. A specific intensity portion of the information configuration is, however, partially reflected at the boundary surface 031 and is supplied to the zone 324 of the optical guide plate, via the optically non-linear crystal 36, and thence to the optical and communication output 3310.

The optical non-linearity provided by the optical component 36 assumes the function of an operator acting upon the information configuration. This operator may construct a completely new information configuration from the first information configuration. This usually does not relate to a mere reconfiguration or reshaping of the information content, but relates to the production of a new information content by a reaction of coherent and non-coherent information components of the optically non-linear element.

If, for example, an optically non-linear KDP crystal is utilized as the optical component 36, then, as is well known, various polarized component beams of variable path length, which have to traverse an interferometrical branch off, must penetrate the double refractory medium as an ordinary and extraordinary beam. The two component beams perform an alternating action, in accordance with their phase adjustment, which results in a frequency sequence of harmonics. The interference alternating effect of the component beams may be controlled by a variation of the mutual phase adjustment. The intensities of the harmonic depend strongly upon the difference in the optical path.

The aforedescribed non-linear effect of the double refractory medium is thus utilized as a communication technical operation for an information configuration. The controllable composition of the information configuration is transformed into at least one new filterable information configuration, without the loss of its own existence.

In FIG. 3, the conventional components for filtering operations are not illustrated, in order to maintain the clarity of illustration. This relates to an active reading operation of an information configuration, whereby the derived structural coherence may be spontaneously emitted as a new independent information configuration, in addition to the one read out, and may provide, together with the former, an expanded information configuration. The new information configuration has its own complex switching potential, however. This is an example of the reaction capability with regard to the information of an information configuration, as hereinbefore described more than once.

The reading operation of specific composition conditions in an information configuration which itself represents a sign system, is possible due to the intensity of a harmonic produced in the double refractory medium corresponding to a correlation function of the primary signal function of the transformed information configuration. The component information encoded in the controllable phase conditions of the branched off and variously polarized component beams or rays within the information configuration, is read out via the correlation function and is provided as a new independent information configuration.

It is readily seen that, in a manner similar to the aforedescribed information configuration, stemming from the information content of the laser element 341, an information configuration of the same stage may be constructed from the information content of the laser element 34 in the network of optical branches or branch offs of the integrated system. Various information mixtures occur thereby in the individual component beams, so that in each of the three provided optical and communication-technical outputs, a separate information mixture is emitted. From the point of view of communication technique, the important factor is that within a specific stage of the layered information arrangement, branched off component beams are coherent within their own information configuration or shape with regard to component beams of another information configuration or shape constructed in the same optical network of the integrated system, but forming no coherence.

Next to the automatic correlation functions of each individual information configuration, it is possible to utilize, principally in the optical component 36, or in another component not shown in the FIGS. and having appropriate double refractory characteristics, cross-correlation functions of non-coherent signal functions derived from the various information configurations, in the form of readout operators and active transformation operators for new information configurations. It is most important that at least two laser-active elements of the optical network of the integrated system be optically coupled to provide a mutual influence or transfer of information. This may be accomplished in different ways.

The optical switching of one laser element by another is important, since this permits, within an optical network of the integrated system of the invention, complex switching operations with regard to information, between the information configurations of the provided information mixtures. As hereinbefore explained, these complex switching operations may be conceived as reactions between information configurations.

The last stage in the construction of a layered arrangement of information configurations in information mixtures is realized by the fact that, within the optical network of the integrated system, at least two laser-active elements cooperate in the optical alternating effect and a coherent optical coupling of at least one type is effected between said laser-active elements. In this regard, the primarily important factor is that the physical conditions afford a coherent coupling between initially independent information configurations. The coupling is doubly utilized. That is, the coupling is utilized to construct larger information configurations from smaller ones and for coherent complex switching of information configurations via other information configurations.

Since the switching reactions in a coherent optical coupling of the participating laser elements are of an active character, it is possible to produce new information configurations in information mixtures from interreacting information configurations with a combined information content. This illustrates the cybernetic importance of my invention. The logical sense continuation in the sign and symbol system of the information configurations is fundamentally assured by the character and physical reproducibility of the statistical median values in information reaction between information configurations. In a double refraction medium, such as that provided by the operational component 36, the last disclosed stage utilizes the cross-correlation functions of coherent signal functions from various information configurations for the provision of the resulting information configurations.

The invention illustrates new possibilities for communication technique and information theory, which require for their understanding a series of concepts and assumptions which are not customary in such matters. This makes the understanding of the scope of the invention and of the communication possibilities provided thereby more difficult. In order to alleviate such difficulty, a brief summation is hereinafter provided.

The summation points out, as a possible useful example, the known subject of holography. Although the spatial aspect during the interference of information carrying coherent component beams is utilized in holography, the invention places the time aspect within the coherent structure of information configurations in information mixtures into the foreground. This results in the non-exclusion of the possibility of reducing spatial interferences. The information configurations relate as an information upon a multidimensional sign or symbol system. A sign or symbol system is so represented in operations within the operating network of the integrated system of the invention, that during alternating interference effects of coherent information components, the time aspect of the coherence is utilized for the communication technique.

Prisms of the Glan-Thompson type may be utilized in the polarizers illustrated in the FIGS. The polarizers may be utilized outside the integrated system, as well as within it. Conventional optical aids such as, for example, optical filters, at the optical outputs of the integrated system, are not specifically illustrated, in order to maintain the clarity of illustration.

The FIGS. do not illustrate the electrical switching paths of the integrated solid state system of the invention, which paths primarily diffuse or alloy into the substrate below the optical guide plate and provide the electrical switching connections of the optical-electronic components of said integrated system. Such electrical switching paths are not shown, in order to maintain the clarity of illustration. For the same reason, conventional electrical contacts and connections of the integrated system are not illustrated.

The original crystal has a length of 10 mm, in a relatively large, integrated device and a corresponding width of 4.5 mm, and a thickness of 1 to 2 mm. The indiffused, alloyed-in or epitactic layers for the electrical and optical switching and/or structural components of the integrated system have a depth in the order of magnitude of 0.1 mm. This depth may vary somewhat more or less and the indicated value may be varied in an appropriate sense.

The original crystal of the optical-electronic system may also have a surface of base area of 1.5 cm × 1.5 cm, and a thickness of 3 mm. The thickness of the optical conductance path is approximately 0.3 mm. The dimensions of the remaining portions of the integrated system are accordingly subordinated to these dimensions.

The frequencies of the laser diodes lie within the range of the feasible frequencies, that is, between wavelengths from 0.3 $\mu$m to 3 $\mu$m and frequencies of approximately $10^{15}$ to $10^{14}$ Hz. An expansion of the wave range generated by the lasers may be expected, however, following shorter and longer waves. Therefore, the invention is not limited to the aforedescribed frequency range, which is presented only as an example.

While the invention has been described by means of specific examples and in specific embodiments, I do not wish to be limited thereto, for obvious modifications will occur to those skilled in the art without departing from the spirit and scope of the invention.

I claim:

1. An integrated optical-electronic solid state system comprising a crystal substrate having a surface having a matrix containing a substantially complete spatial integration arrangement of the desired optical-electronic operations, said matrix having at least two circuit layers one above the other and each substantially parallel to the surface of said substrate, said components being positioned in said two circuit layers;

optical paths for optically intercoupling corresponding ones of said optical components, said optical paths extending in at least one of said layers predominately in directions parallel to the surface of said substrate;

additional optical paths for the optical-electronic coupling of the optical components and the electronic components in accordance with the integration arrangement of said matrix, said additional optical paths extending at correspondingly different localities of the surface of said substrate in directions substantially perpendicular to said surface whereby communication technical operations are performable in each of said layers and between said layers, said matrix at least partly providing a carrier of said components and of electrical current paths between at least some of said components, said matrix having openings at specific localities through which data carrying light beams may pass in specific directions;

an optical guide plate for the propagation of light within and parallel to said guide plate in any desired directions, said guide plate comprising different optically functional areas, said guide plate having optical inputs and outputs;

at least two solid state light sources optically coupled to said guide plate in a manner whereby when said light sources are operative an information content is provided comprising information components constituted by a network of optically correlated component light beams, said information content having an information structure comprising a plurality of information components adjustable via the intensity ratios, the phase relations, the polarization conditions, the coherence relations and the optical path length differences of branched and recombined component optical beams, said information structure comprising correlated and non-correlated phase shares and having correspondingly different cooperative switching conditions dependent upon internal optical couplings whereby the supply to said network of additional information in the form of component optical beams produces a reactionable layered information character, the optical outputs of said guide plate functioning to radiate as outputs the complex information of said different switching conditions.

2. An integrated system as claimed in claim 1, wherein each of said light sources comprises a laser diode.

3. An integrated system as claimed in claim 1, wherein said optical guide plate comprises a plurality of component zones of a material transparent to optical frequencies utilized, said zones having polished boundary surfaces in direct abutment with each other.

4. An integrated system as claimed in claim 3, wherein one of the component zones of said optical guide plate is a prism.

5. An integrated system as claimed in claim 3, wherein said light sources comprise at least two spaced parallel laser elements optically coupled with said optical guide plate and optically coupled with each other and themselves via said optical guide plate.

6. An integrated system as claimed in claim 3, wherein one of the component zones of said optical guide plate is an optically non-linear double refraction component.

7. An integrated system as claimed in claim 3, further comprising an optical branch point in the optical path being utilized.

8. An integrated system as claimed in claim 3, wherein one of the component zones of said optical guide plate is a polarizer for the light beam.

9. An integrated system as claimed in claim 3, wherein one of the component zones of said optical guide plate is an analyzer for the light beam.

10. An integrated system as claimed in claim 3, wherein said optical guide plate includes and combines optical-electronic functional components by optical paths of variable lengths.

11. An integrated system as claimed in claim 3, wherein the optical paths terminate in the optical outputs.

12. An integrated system as claimed in claim 6, wherein the optically non-linear double refraction component of said optical guide plate comprises a KDP crystal.

13. An integrated system as claimed in claim 8, wherein the polarizer of said optical guide plate controls the polarization capacity of the optical path.

14. An integrated system as claimed in claim 8, wherein the polarizer of said optical guide path controls the optical path length of the optical path.

15. A method of operating an integrated optical-electronic solid state system including sources of radiation, said method comprising the steps of radiating coherent light from the sources to provide an at least partly interfering network of light beams;

controlling the intensity ratios, phase relations, frequencies, polarization conditions and coherence relations of branched off and combined light beams to produce an information structure comprising a plurality of information components and;

variably switching the information structure to provide a complex information content having a layered arrangement of information configuration representing specific information codes.

16. A method as claimed in claim 15, wherein the produced combined information content is emitted with variable information structures which may react with other systems.

17. A method as claimed in claim 15, wherein the coherent light is radiated in optical alternation to produce a coherent optical coupling between the sources of radiation to shape the information into an information mixture having a reactionable information configuration.

18. An integrated optical-electronic solid state system comprising a plurality of optical and electronic components;

a crystal substrate for integrating the optically and electronically operating components, said substrate having a surface having a matrix having at least two circuit layers one above the other and each substantially parallel to the surface of said substrate, said components being positioned in said two circuit layers;

optical paths optically intercoupling corresponding ones of said optical components and extending in at least one of said layers predominantly in directions parallel to the surface of said substrate;

an optical guide plate for propagating light within and parallel to said guide plate in any desired directions, said guide plate comprising different optically functional areas and having optical inputs and outputs;

at least two solid state light sources optically coupled to said guide plate in a manner whereby when said light sources are operative an information content is provided comprising information components constituted by a network of optically correlated component light beams, said information content having an information structure comprising a plurality of adjustable information components, said information structure comprising correlated and non-correlated phase shares and having correspondingly different cooperative switching conditions dependent upon internal optical couplings.

19. An integrated system as claimed in claim 18, wherein said matrix contains a substantially complete spatial integration arrangement of the desired optical-electronic operations as to their totality of functioning, and further comprising additional optical paths for the optical-electronic coupling of the optical components and the electronic components in accordance with the integration arrangement of said matrix, said additional optical paths extending at correspondingly different localities of the surface of said substrate in directions substantially perpendicular to said surface whereby communication technical operations are performable in each of said layers and between said layers, said matrix at least partly providing a carrier of said components and of electrical current paths between at least some of said components, said matrix having openings at specific localities through which data carrying light beams may pass in specific directions.

20. An integrated system as claimed in claim 18, wherein said information structure comprises a plurality of information components adjustable via the intensity ratios, the phase relations, the polarization conditions, the coherence relations and the optical path length differences of branched and recombined component optical beams, and wherein the supply to said network of additional information in the form of component optical beams produces a reactionable layered information character with extremely rapid switching between the different conditions of said information structure, the optical outputs of said guide plate functioning to radiate as outputs the complex information of said different switching conditions.

* * * * *